(12) United States Patent
Harnik et al.

(10) Patent No.: US 10,884,938 B2
(45) Date of Patent: Jan. 5, 2021

(54) METHOD AND APPARATUS FOR PREFETCHING DATA ITEMS TO A CACHE

(71) Applicant: International Business Machines Corporation, Armonk, NY (US)

(72) Inventors: Danny Harnik, Tel Mond (IL); Effi Ofer, Tel Aviv (IL); Dafna Sadeh, Pardesiya (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/218,517

(22) Filed: Dec. 13, 2018

(65) Prior Publication Data
US 2020/0192811 A1 Jun. 18, 2020

(51) Int. Cl.
G06F 12/0888 (2016.01)
G06F 12/121 (2016.01)
G06N 20/00 (2019.01)
G06F 12/0897 (2016.01)

(52) U.S. Cl.
CPC ...... *G06F 12/0888* (2013.01); *G06F 12/0897* (2013.01); *G06F 12/121* (2013.01); *G06N 20/00* (2019.01)

(58) Field of Classification Search
CPC ............. G06F 12/0888; G06F 12/0897; G06F 12/121; G06N 20/00
See application file for complete search history.

(56) References Cited

U.S. PATENT DOCUMENTS

| 6,360,299 B1 * | 3/2002 | Arimilli | G06F 12/0862 711/118 |
| 6,842,180 B1 * | 1/2005 | Maiyuran | G06F 12/0862 345/541 |
| 8,788,757 B2 | 7/2014 | Daly et al. | |
| 9,858,190 B2 * | 1/2018 | Ambroladze | G06F 12/0855 |

(Continued)

FOREIGN PATENT DOCUMENTS

CN 107168652 9/2017

OTHER PUBLICATIONS

Chtourou et.al. "Performance Evaluation of Neural Network Prediction for Data Prefetching in Embedded Applications" (Year: 2007).*

*Primary Examiner* — Tasnima Matin
(74) *Attorney, Agent, or Firm* — Ziv Glazberg (57) ABSTRACT

An apparatus, a computer program and a method for prefetching a predetermined number of data items to a cache. The method comprises obtaining a list of candidate data items and associated scores thereof, that comprises more candidate data items than the predetermined number of data items to be prefetched to the cache. The method comprises repeatedly selecting, based on scores of the candidate data items, a candidate data item from the list and determining whether to add the candidate data item to the cache. Determining whether to add the candidate data item to the cache comprises determining whether the candidate data item is retained by the cache; and in response to determining that the candidate data item is not retained by the cache, adding the candidate data item thereto. The repeatedly selecting and determining are performed until the predetermined number of data items is added to the cache.

19 Claims, 3 Drawing Sheets

(56) References Cited

U.S. PATENT DOCUMENTS

| | | | |
|---|---|---|---|
| 2005/0268039 A1* | 12/2005 | Archambault | G06F 9/30047 711/119 |
| 2006/0106991 A1* | 5/2006 | Franaszek | G06F 12/0862 711/137 |
| 2008/0147980 A1* | 6/2008 | Peters | G09G 5/395 711/133 |
| 2017/0004093 A1 | 1/2017 | Susarla et al. | |
| 2017/0123988 A1* | 5/2017 | Chun | G06F 12/0246 |
| 2019/0325298 A1* | 10/2019 | Chen | G06N 3/063 |

* cited by examiner

METHOD AND APPARATUS FOR PREFETCHING DATA ITEMS TO A CACHE

TECHNICAL FIELD

The present disclosure relates to Cache data storage in general, and to Cache prefetching, in particular.

BACKGROUND

A cache may be a hardware or software component that stores data so that future requests for that data can be served faster. Data stored in a cache may be the result of an earlier computation, a copy of data stored elsewhere, or the like. A cache hit may occur when the requested data can be found in a cache. Cache hits may be served by reading data from the cache, which is faster than re-computing a result or reading from a slower data store. Thus, the more requests that can be served from the cache, the faster the system may perform.

Caches have proven themselves in many areas of computing, because typical computer applications access data with a high degree of locality of reference. Such access patterns may exhibit temporal locality, where data is requested that has been recently requested already; and spatial locality, where data is requested that is stored physically close to data that has already been requested.

Cache prefetching may be a technique used by computer processors to boost execution performance by fetching instructions or data from their original storage in slower memory to a faster local memory before it is actually needed. Modern computer processors may have fast and local cache memory in which prefetched data may be held until it is required. The source for the prefetch operation may usually be main memory. Because of their design, accessing cache memories may be much faster than accessing main memory. As a result, prefetching data and then accessing it from caches may be many orders of magnitude faster than accessing it directly from main memory.

BRIEF SUMMARY

One exemplary embodiment of the disclosed subject matter is a method for prefetching a predetermined number of data items to a cache, comprising: obtaining a list of candidate data items, wherein a number of candidate data items is larger than the predetermined number of data items to be prefetched to the cache, wherein each candidate data item is associated with a score; repeatedly selecting a candidate data item from the list and determining whether to add the candidate data item to the cache, wherein said selecting is based on an order of the list, wherein the order of the list is based on scores of the candidate data items, wherein said determining whether to add the candidate data item to the cache comprises: determining whether the candidate data item is retained by the cache; and in response to determining that the candidate data item is not retained by the cache, adding the candidate data item to the cache; wherein said repeatedly selecting and determining are performed until the predetermined number of data items is added to the cache.

Optionally, the method further comprises in response to determining that the candidate data item is retained by the cache in a cache line, updating an evacuation measurement of the cache line.

Optionally, the cache is a Least Recently Used (LRU) cache, wherein the evacuation measurement is a freshness measurement of the cache line.

Optionally, adding the candidate data item to the cache requires a first processing time duration, wherein said updating the evacuation measurement of the cache line requires a second processing time duration, wherein the second processing time duration is smaller than the first processing time duration.

Optionally, a score associated with each candidate data item indicates the likelihood of the candidate data item being retrieved from the cache.

Optionally, the score associated with each candidate data item is determined by a Machine Learning-based predictor.

Optionally, the Machine Learning-based predictor is based on a Long Short-Term Memory (LSTM) network.

Optionally, determining whether to add the candidate data item to the cache further comprises determining that the score of the candidate data item is above a predetermined threshold.

Optionally, obtaining a list comprises: obtaining an initial list that comprises the list and additional data items; and selecting an N-top candidate data items from the initial list based on corresponding scores thereof, whereby obtaining the list.

Another exemplary embodiment of the disclosed subject matter is an apparatus having a processor, a memory and a cache, the processor being adapted to perform the steps of: obtaining a list of candidate data items, wherein a number of candidate data items is larger than the predetermined number of data items to be prefetched to the cache, wherein each candidate data item is associated with a score; repeatedly selecting a candidate data item from the list and determining whether to add the candidate data item to the cache, wherein said selecting is based on an order of the list, wherein the order of the list is based on scores of the candidate data items, wherein said determining whether to add the candidate data item to the cache comprises: determining whether the candidate data item is retained by the cache; and in response to determining that the candidate data item is not retained by the cache, adding the candidate data item to the cache; wherein said repeatedly selecting and determining are performed until the predetermined number of data items is added to the cache.

Yet another exemplary embodiment of the disclosed subject matter is a computer program product comprising a non-transitory computer readable storage medium retaining program instructions, which program instructions when read by a processor, cause the processor to perform a method comprising: obtaining a list of candidate data items, wherein a number of candidate data items is larger than the predetermined number of data items to be prefetched to the cache, wherein each candidate data item is associated with a score; repeatedly selecting a candidate data item from the list and determining whether to add the candidate data item to the cache, wherein said selecting is based on an order of the list, wherein the order of the list is based on scores of the candidate data items, wherein said determining whether to add the candidate data item to the cache comprises: determining whether the candidate data item is retained by the cache; and in response to determining that the candidate data item is not retained by the cache, adding the candidate data item to the cache; wherein said repeatedly selecting and determining are performed until the predetermined number of data items is added to the cache.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to improve the cache hit ration. In some exemplary embodiments, a cache hit may occur when the requested data can be found in a cache. A cache miss may occur when the requested data is not found in the cache. Cache hits may be served by reading data from the cache, which may be faster than recomputing a result, reading from a slower data storage, or the like. As a result, the more requests that can be served from the cache, the faster the system may perform. On the other hand, in order to be cost-effective and to enable efficient use of data, caches may be required to be small. Cache management systems may attempt to improve cache hit ration by making decisions regarding what to bring and what to evacuate from the cache.

In some exemplary embodiments, when a cache client, such as a Central Processing Unit (CPU), a web browser, an operating system, or the like, needs to access data presumed to exist in the backing store; the cache client may first check the cache. If an entry can be found with a tag matching that of the desired data, the data in the entry may be used instead. This situation is known as a cache hit. The alternative situation, when the cache is checked and found not to contain any entry with the desired tag, may be known as a cache miss. Such a situation may require a more expensive access of data from the backing store. Once the requested data is retrieved, it may typically be copied into the cache, ready for the next access.

Another technical problem dealt with by the disclosed subject matter is to improve the efficiency of searching data in the cache. In some exemplary embodiments, during a cache miss, some other previously existing cache entry may be removed in order to make room for the newly retrieved data. The heuristic used to select the entry to replace is may be known as the replacement policy. One replacement policy, "least recently used" (LRU), may replace the oldest entry, the entry that was accessed less recently than any other entry (see cache algorithm). Additionally or alternatively, caching algorithms may compute the use-hit frequency against the size of the stored contents, as well as the latencies and throughputs for both the cache and the backing store. However, such techniques may not guarantee to efficiently find data that is configured to be requested soon.

Yet another technical problem dealt with by the disclosed subject matter is to enhance the performance of cache prefetching. In some exemplary embodiments, data or instructions may be prefetched to the cache before it is needed, in order to allow a fast retrieval of the data and to boost execution performance. Accurate data prefetching may be a challenging task. In some exemplary embodiments, prefetching techniques may receive a request to prefetch a predetermined number of data items, and may prefetch all the predetermined number of items, while overwriting some existing items in the cache. Such methods, besides overwriting existing items, may reduce the coverage of the cache. Coverage may be the fraction of total misses that are eliminated because of prefetching. If the prefetching technique write over items that are likely to have a hit, the coverage may be low. Furthermore, the accuracy of such techniques, which may be defined as the fraction of total prefetches that were useful (e.g., the ratio of the number of memory addresses prefetched were actually referenced by the program to the total prefetches done) may be low.

Yet another technical problem dealt with by the disclosed subject matter is to reduce the time required for the prefetching. In some exemplary embodiments, prefetching time efficiency may be measured by how early a block is prefetched versus when it is actually referenced. Existing prefetching techniques may not be time effective, especially in case of prefetching existing data, or prefetching data in distinct locations in the cache.

One technical solution is to improve cache hit ration by prefetching data into the cache before requesting, while reducing a likelihood of data requested to be evacuated therefrom and rearranging the order of prefetched data, in accordance with this likelihood.

In some exemplary embodiments, a predetermined number of data items may be required to be prefetched to the cache. A list of candidate items to be prefetched in a cache may be obtained. The number of candidate items may be greater than the predetermined number of data items required to be prefetched to the cache, such as about twice predetermined number, about three times the predetermined number, 10+ the predetermined number, 100+ the predetermined number or the like. Additionally or alternatively, the list of candidate items may be selected from and an initial list that comprises additional data items. The list of candidate items may be selected based on corresponding scores of the data items in the initial list.

In some exemplary embodiments, a score may be assigned to each candidate data item. The score associated with each candidate data item may be configured to indicate the likelihood of the candidate data item being retrieved from the cache. The scores may be determined by a Machine Learning-based predictor, such as Long Short-Term Memory (LSTM)-based predictor The list of candidate data items may be sorted in descending order of the scores of the candidates. Additionally or alternatively, the score may be indicative of a ratio between likelihood of the candidate data item being retrieved from the cache and the size thereof. As an example, the score may be a number between 0 and 1 where 0 means zero likelihood while 1 means 100% probability of the candidate being requested for reading in the near future.

In some exemplary embodiments, a candidate data item, with the highest score may be selected iteratively, to determine whether to be added to the cache. In case the candidate data item is not yet retained by the cache, the candidate data item may be added to the cache. In case the candidate data item is already retained by the cache, an evacuation measurement of the cache line of the respective data item may be updated so as the candidate item may be moved to a location in the cache where it may be retrieved the fastest. As an example, in a First in First Out (FIFO) cache, which behaves in the same way as a FIFO queue, the cache may be configure to evict the first block accessed first without any regard to how often or how many times it was accessed before. In such a cache, the candidate data item may be moved to the first block of the cache. As another example, in a Last in First Out (LIFO) cache, which may be configured to evict the block accessed most recently first without any regard to how often or how many times it was accessed before, the candidate data item may be moved to the last block of the cache (the end of the items). As yet another example, in an LRU cache, where the evacuation measurement is a freshness measurement of the cache line, the cache may require keeping track of what was used when and discarding the least recently used item. In such a case the candidate data item may be updated to be the most used data item.

In some exemplary embodiments, selecting the candidate data item with the highest score from a remainder of candidate data items, may be repeatedly performed, until the predetermined number of data items is added to the cache. As an example, after the candidate data item, with the highest score has been handled (added to the cache or updated the location thereof), the candidate data item may be removed from the candidate data items list, and a counter of the number of items inserted to the cache may be raised by one in case the candidate data item is being added to the cache.

In some exemplary embodiments, additional considerations may affect the decision whether to add the candidate data item to the cache, such as the size of the candidate data item being below a predetermined threshold, the score of the candidate data item being above a predetermined threshold, a ratio between the size and the score of the candidate data item, or the like.

One technical effect of utilizing the disclosed subject matter is improving the efficiency of cache prefetching. As the number of data items allowed to be prefetched may be limited, such as due to limited available resources of the cache, prefetching more essential data items may be more effective. The disclosed method, determines for each candidate data item a score based on the likelihood thereof to be requested for evacuation from the cache; and prefetch data items with the highest scores. Data items that are more likely to be evacuated may be prefetched to the cache. As a result, the cache hit ration may be improved with respect to respective cache hit ration achieved by the same limited resources.

Another technical effect of utilizing the disclosed subject matter is reducing the processing time of cache prefetching. In the disclosed subject matter, only candidate data items that are not retained by the cache may be added to the cache. Evacuation measurement of the cache line of Data items that are already retained by the cache may be updated. Updating the evacuation measurement of the cache line requires a processing time duration that is smaller than processing time duration of adding a candidate data item to the cache. The processing time duration of updating the evacuation measurement may even be smaller by order of magnitudes than adding a new data item. As the disclosed method, avoids re-adding data items that are already retained by the cache, and instead updating the evacuation measurement of the cache line of such item; the disclosed method may not only enable adding more data items to the cache within the same time, but may also reduce the time required for prefetching the cache.

As yet another technical effect of utilizing the disclosed subject matter is to decrease the likelihood of objects that are likely to be requested from the cache being removed from the cache. The bumping up of the candidate data items (e.g., updating the evacuation measurement of the cache line associated thereof) reduces the likelihood of writing over these cache lines, removing these data items from the cache, or the like. As a result, the cache hit ration may be improved, as such data items may be found in the cache.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Figure 1:
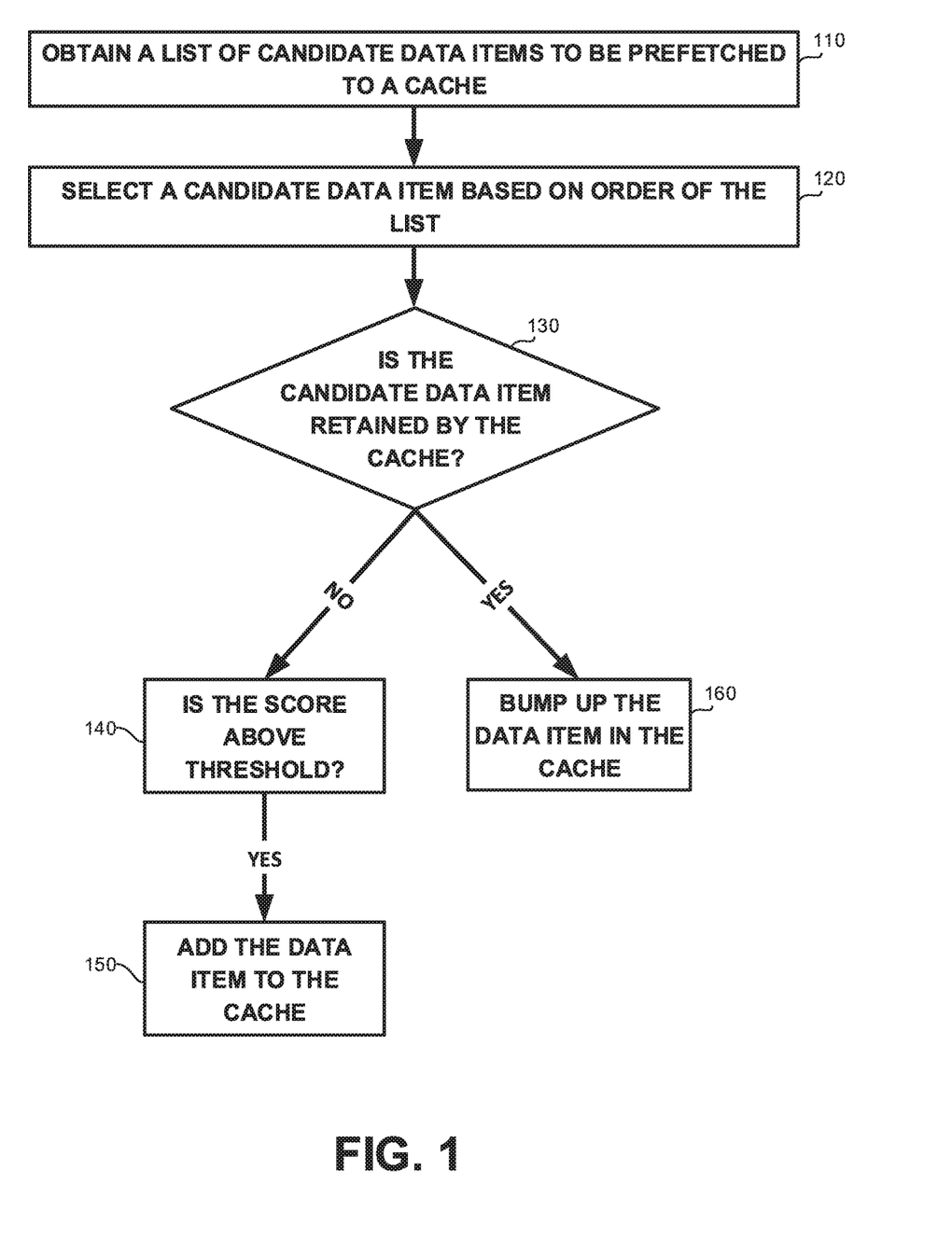
FIG. 1 shows a flowchart diagram of a method, in accordance with some exemplary embodiments of the disclosed subject matter.

Referring now to FIG. 1 showing a flowchart diagram of a method, in accordance with some exemplary embodiments of the disclosed subject matter.

On Step 110, a list of candidate data items to be prefetched to a cache may be obtained. In some exemplary embodiments, the cache may be configured to prefetch the data items so that future requests for that data items can be served faster. The data items may be data, instructions, or the like. In some exemplary embodiments, an initial list larger than the list may be obtained. An N-top candidate data items may be selected from the initial list based on corresponding scores thereof, in order to obtain the list. N may be larger than the predetermined number of data items may be planned to be prefetched to the cache, such as twice the predetermined number, three times the predetermined number, ten times the predetermined number, or the like.

In some exemplary embodiments, each candidate data item may be associated with a score. The score associated with each candidate data item may be configured to indicate the likelihood of the candidate data item being retrieved from the cache. The scores may be determined by a Machine Learning-based predictor. In some exemplary embodiments, the Machine Learning-based predictor may be configured to utilize an LSTM network. An LSTM network may be a type of a Recurrent Neural Network (RNN). An LSTM may be composed of a cell, inputs and outputs. The cell may be configured to remember values over time and so may be well suited for making predictions based on time series type date. The LSTM network may be configured to make predictions regarding the likelihood of data items to be read from the cache, based on time series data. Additionally or alternatively, other algorithms may be used, such as other RNNs, hidden Markov models, sequence learning methods, or the like.

On Step 120, a candidate data item may be selected based on an order of the list. In some exemplary embodiments, the order of the list may be based on scores of the candidate data items. As an example, the candidate data item with the highest score may be selected.

On Step 130, a determination whether the candidate data item is retained by the cache may be performed.

On Step 140, in case the candidate is not retained by the cache, a determination whether the score of the candidate data item is above a predetermined threshold may be performed. As an example, the threshold may be about 0.90, 095, or the like.

On Step 150, in response to determining the candidate data item is not retained by the cache, and that the score thereof is above the predetermined threshold, the candidate data item may be added to the cache. The data item may be added to a cache line of the cache, based on prefetching policy of the cache. As an example, in a FIFO cache, the candidate data item may be added to the last block of the cache. As another example, in a LIFO cache, the candidate data item may be moved to the first block of the cache. As yet another example, in an LRU cache, the candidate data item may be updated to be the least used data item.

In some exemplary embodiments, in order to add a new data item, and there is no empty cache line therefor, a previously existing cache line, may be removed in order to make room for the newly data item. The heuristic used to select the entry or the cache line to replace may be known as the replacement policy. One replacement policy may LRU, which may be configured to replace the oldest entry, the entry that was accessed less recently than any other entry. Additionally or alternatively, the caching algorithm may compute the use-hit frequency against the size of the stored contents, as well as the latencies and throughputs for both the cache and the backing store.

Additionally or alternatively, the candidate may be only determined to be not retained by the cache before being added to the cache, e.g., without performing Step 140.

On Step 160, in response to the candidate data item being retained by the cache, the candidate data item may be bumped up in the cache. In some exemplary embodiments, bumping up the candidate data item may be performed by updating an evacuation measurement of the cache line that the data item is retained therein. As an example, in a FIFO cache, the candidate data item may be moved to the first block of the cache. As another example, in a LIFO cache, the candidate data item may be moved to the last block of the cache.

In some exemplary embodiments, the cache may be an LRU cache. The evacuation measurement may be a freshness measurement of the cache line. In an LRU cache, the candidate data item may be updated to be the most used data item.

It may be appreciated that the processing time duration required for adding the candidate data item to the cache (e.g., Step 150) may be larger of an order of a magnitude than the processing time duration required for updating the evacuation measurement of the cache line (e.g., Step 160).

In some exemplary embodiments, Steps 120-160 may be repeatedly performed until the predetermined number of data items is added to the cache. It may be appreciated, that the stop condition for repeatedly performing Steps 120-160 may be determined based on other criteria, such as reviewing a predetermined number of recommended candidate data items, reviewing a predetermined number of data items, time criterion, or the like.

Figure 2:
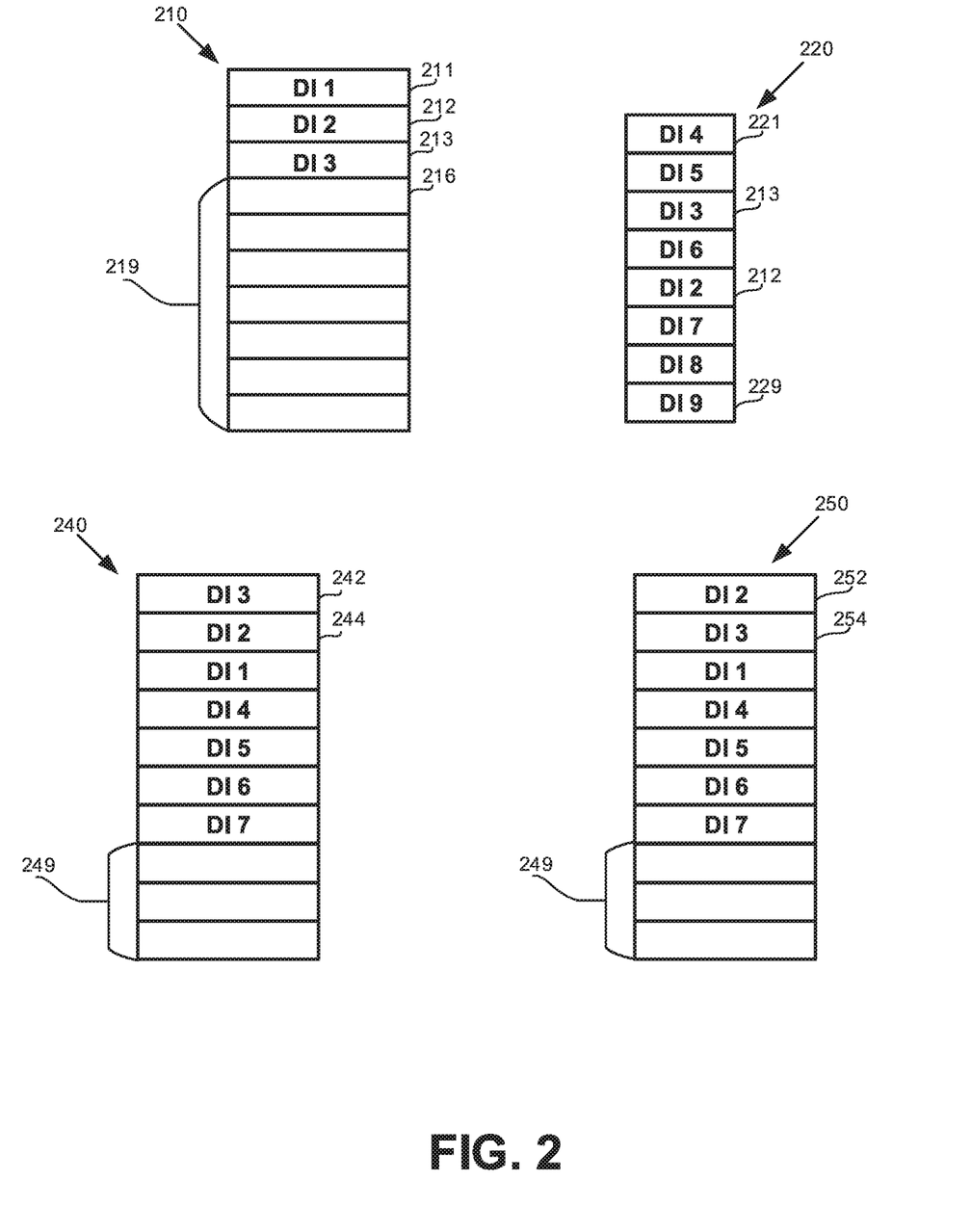
FIG. 2 shows schematic illustrations of an exemplary cache, before and after prefetching, in accordance with some exemplary embodiments of the disclosed subject matter.

Referring now to FIG. 2 showing schematic illustrations of an exemplary cache before and after prefetching, in accordance with some exemplary embodiments of the disclosed subject matter.

A Cache 210 may be configured to store data that may be a result of an earlier computation, a copy of data stored elsewhere, or the like. Cache 210 may comprise a plurality of cache lines. Some cache lines, such as Entry 211 may have an associated data (e.g., Data Item 1). The associated data may be a copy of the same data in some backing store. Additionally or alternatively, each cache line may be associated with an identifier. The identifier may be configured to specify the identity of the data in the backing store of which the entry is a copy. Additionally or alternatively, some cache lines, such as Entry 216 may be an empty entry, where new data can be fetched. As an example, Cache 210 comprises a Block 219 of 7 empty cache lines.

In some exemplary embodiments, a cache prefetching of data items to Cache 210. The number of data items to be prefetched may be predetermined. As an example, 4 data items may be requested to be prefetched to Cache 210. It may be appreciated that in some cases, the predetermined number of data items to be prefetched may be greater than the number of empty cache lines in Block 219.

In some exemplary embodiments, a Candidate List 220 comprising data items to be prefetched to Cache 210 may be obtained, such as from backing store, storage, memory, CPU, or the like. The number of candidate data items in Candidate List 220 may be larger than the predetermined number of data items to be prefetched to Cache 210. As an example, Candidate List may comprise 8 candidate data items, which is larger than the 4 data items requested to be prefetched.

In some exemplary embodiments, Candidate List 220 may be sorted in accordance with scores assigned to data items therein. The score associated with each candidate data item may be configured to indicate the likelihood of the candidate data item being retrieved from Cache 210. It may be appreciated that the scores may be pre-assigned to the candidate data items, such as the by the source of the candidate data items, by a user, by a CPU, or the like. Additionally or alternatively, in each prefetching iteration, the scores may be determined by Cache 210, by an entity responsible for the prefetching process, or the like. It may further be appreciated that the scores of candidate data items in Candidate List 220 being above a predetermined threshold of scores set as a condition for prefetching to Cache 210.

In some exemplary embodiments, Candidate List 220 may comprise data items that are already retained by Cache 210, such as Data Item 2 retained in Entry 212 and Data Item 3 retained in Entry 213. Additionally or alternatively, new data items, such as Data Item 4 in Entry 221, having the highest score, Data Item 9 in Entry 229, having the lowest score, or the like.

In some exemplary embodiments, in each iteration, the candidate data item with the highest score may be selected from the Candidate List 220 and determined whether to be added to Cache 210. In case that the candidate data item is not retained by Cache 210, the candidate data item may be added to Cache 210 in the first empty cache line. As an example, Data Item 4 may be added to Entry 216 of Cache 210. Additionally or alternatively, in case that the candidate data item is already retained by Cache 210 in a cache line, an evacuation measurement of the cache line may be updated. As an example, after adding Data Item 4 and Data Item 5, Data Item 3, may be found to be retained in Entry 213. The cache line associated with Entry 213, may be moved to the top of Cache 210.

In some exemplary embodiments, selecting data items and adding to Cache 210, may be repeatedly performed until the predetermined number of data items is added to Cache 210, e.g., until 4 new data items are added to Cache 210. After adding Data Items 4 and 5, and updating the evacuation measurement of Entry 213, Data Item 6 may be added to Cache 210, reaching 3 added data items thereto. Then Data Item 2 may be found to be retained in Cache 210 in the cache line associated with Entry 212, and thus the evacuation measurement thereof may be updated. In some exemplary embodiments, the evacuation measurement may be updated to be at the top of Cache 210 (e.g., as the freshest, the most recent, or the like), such as in Prefetched Cache 250. Data Item 2, that has been found after Data Item 3, may be retained in Cache Line 252, above Cache Line 254 retaining Data Item 3. Additionally or alternatively, the evacuation measurement may be updated in accordance with the score of the data item, such as in Prefetched Cache 240 where Data Item 2, that has been found after Data Item 3, may be retained in Cache Line 244, below Cache Line 242 retaining Data Item 3, as the score of Data Item 3 is higher than the score of Data Item 2.

In some exemplary embodiments, after adding Data Items 4, 5, and 6 and updating the evacuation measurement of Entry 213 and Entry 212, Data Item 7 may be added to Cache 210, reaching 4 added data items thereto. As a result, the prefetching process may be terminated for reaching the predetermined number of requested data items to be prefetched to Cache 210. The prefetched cache (e.g., 240 or 250) may still have a Block 249 of empty cache lines.

Figure 3:
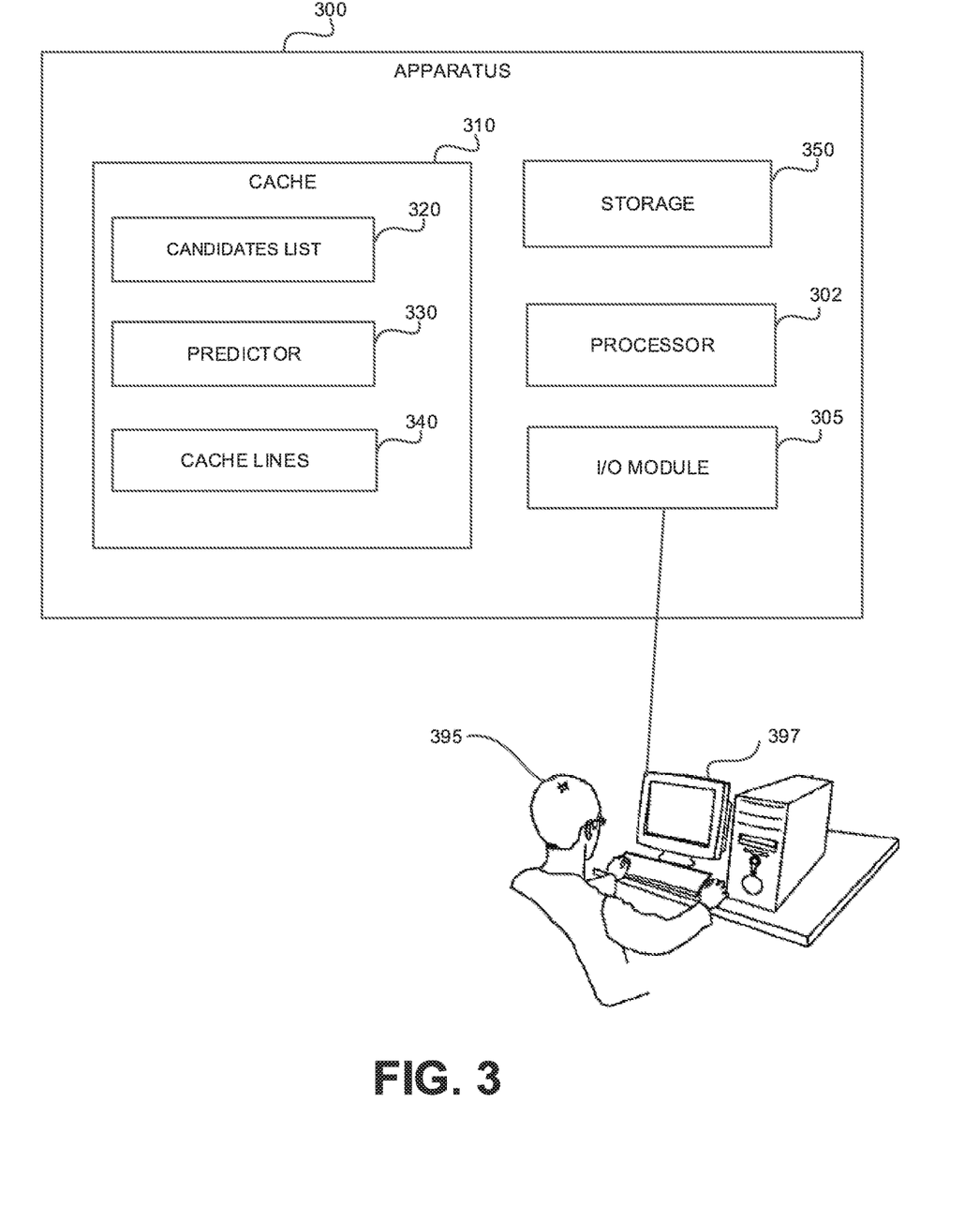
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter. An Apparatus 300 may be configured to support parallel user interaction with a real world physical system and a digital representation thereof, in accordance with the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 305. I/O Module 305 may be utilized to provide an output to and receive input from a user, such as, for example data to be saved in Storage 350, or the like.

In some exemplary embodiments of the disclosed subject matter, Apparatus 300 may comprise a Storage 350. Storage 350 may be configured to retain data for Apparatus 300, such as data generated by computations of Processor 302, data obtained from I/O Module 305, or the like.

In some exemplary embodiments of the disclosed subject matter, Apparatus 300 may comprise a Cache 310. Cache 310 may be configured to store data so that future requests for that data can be served faster. Data stored in Cache 310 may be the result of an earlier computation or a copy of data stored elsewhere, such as in Storage 350 or in other storage external to Apparatus 300. It may be appreciated that because of the design of Cache 310, accessing Cache 310 may be much faster than accessing Storage 350.

In some exemplary embodiments, Cache 310 may be a hardware cache, such as a CPU cache, an Earlier Graphics Processing Unit (GPU) cache, Digital signal processors (DSPs) cache, or the like. Additionally or alternatively, Cache 310 may be a Software cache, such as a Disk cache, a Web cache, or the like.

In some exemplary embodiments, Cache 310 may comprise Cache Lines 340. Each line of Cache lines 340, may be associated with data, which may be a copy of the same data in some backing store, such as Storage 350. Each line of Cache lines 340 may have an identifier specifying the identity of the data in the backing store of which the cache line is a copy.

In some exemplary embodiments, a cache client, such as Processor 302, CPU (not shown), web browser (not shown), operating system of Apparatus 300 (not shown), or the like, needs to access data presumed to exist in Storage 350, it first may first check Cache 310. If a cache line can be found in Cash Lines 340, with an identifier matching that of the desired data, the data in the cache line may be used instead. This situation may be known as a cache hit. The percentage of accesses that result in cache hits may be known as the hit rate or hit ratio of Cache 310.

Additionally or alternatively, when Cache 310 is checked and found not to contain any cache line with the desired identifier, it may result in a cache miss. This situation may require a more expensive access of data from the Storage 350. Once the requested data is retrieved, it may typically be copied into Cache 310, ready for the next access.

In some exemplary embodiments, Cache 310 may be configured to perform prefetching of data from Storage 350, in order to boost execution performance. Cache 310 may obtain candidates for prefetching from Storage 350.

In some exemplary embodiments, Cache 310 may comprise a Predictor 330. Predictor 330 may be configured to determine for each prefetching candidate a score indication the likelihood of the candidate to be retrieved from Cache 310. Predictor 330 may be configured to perform Machine Learning in order to predict the likelihood. Predictor 330 may be configured to utilize an LSTM network to perform the prediction based on time series data of what data items being retrieved from Cache 310.

In some exemplary embodiments, Cache 310 may be configured to select a N-top candidate data items from the prefetching candidates obtained from Storage 350, based on corresponding scores thereof, whereby generating a Candidate List 320. Candidate List 320 may comprise N candidate data items, sorted based on their scores. N may be a number larger than the predetermined number of data items required to be prefetched to Cache 310.

In some exemplary embodiments, Cache 310 may be configured to repeatedly select a candidate data item from Candidate List 320. In each iteration, Cache 310 may select the candidate data item with the highest score, which has not been selected yet. Cache 310 may be configured to determine whether to add the candidate data item to Cache 310. Cache 310 may be configured to determine whether the candidate data item is retained by Cache 310, e.g., to determine whether Cache Lines 340 comprise a cache line respective to the candidate data item. In response to determining that the candidate data item is not retained by Cache 310, Cache 310 may add the candidate data item to Cache Lines 340. The candidate data item may be added to the first empty cache line, if existing, may be written over the last data item in accordance with the writing policy of Cache 310, or the like.

Additionally or alternatively, in response to determining that the candidate data item is retained by Cache 310 in a cache line, Cache 310 may be configured to updating an evacuation measurement of the cache line. As an example, in case Cache 310 is an LRU cache, the evacuation measurement may be a freshness measurement of the cache line, and it may be updated to be the most fresh cache line in Cache Lines 340.

It may be appreciated that Cache 310 may be configured to repeatedly select and add candidate data items, the predetermined number of data items is added to Cache 310.

In some exemplary embodiments, Cache 310 may be configured to check further limitations before adding a candidate data item thereto, such as a size of the candidate data item being above a predetermined threshold, the score of the candidate data item being above a predetermined threshold, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for prefetching a predetermined number of data items to a cache, comprising:
    obtaining a list of candidate data items to be prefetched, wherein a number of candidate data items is larger than the predetermined number of data items to be prefetched to the cache, wherein each candidate data item is associated with a score, the score indicating a likelihood of the candidate data item to be retrieved from the cache; and
    repeatedly selecting a candidate data item from the list and determining whether to add the candidate data item to the cache, wherein said selecting is based on an order of the list, wherein the order of the list is based on scores of the candidate data items, wherein said determining whether to add the candidate data item to the cache comprises:
        determining whether the candidate data item is retained by the cache; and
        in response to determining that the candidate data item is not retained by the cache, adding the candidate data item to the cache;
    wherein said repeatedly selecting and determining are performed until the predetermined number of data items is added to the cache.

2. The method of claim 1 further comprising:
    in response to determining that the candidate data item is retained by the cache in a cache line, updating an evacuation measurement of the cache line.

3. The method of claim 2, wherein the cache is a Least Recently Used (LRU) cache, wherein the evacuation measurement is a freshness measurement of the cache line.

4. The method of claim 2, wherein said adding the candidate data item to the cache requires a first processing time duration, wherein said updating the evacuation measurement of the cache line requires a second processing time duration, wherein the second processing time duration is smaller than the first processing time duration.

5. The method of claim 1, wherein a score associated with each candidate data item indicates the likelihood of the candidate data item being retrieved from the cache.

6. The method of claim 5, wherein the score associated with each candidate data item is determined by a Machine Learning-based predictor.

7. The method of claim 6, wherein Machine Learning-based predictor is based on a Long Short-Term Memory (LSTM) network.

8. The method of claim 1, wherein said determining whether to add the candidate data item to the cache further comprises determining that the score of the candidate data item is above a predetermined threshold.

9. The method of claim 1, wherein said obtaining a list comprises:
    obtaining an initial list that comprises the list and additional data items; and
    selecting an N-top candidate data items from the initial list based on corresponding scores thereof, whereby obtaining the list.

10. An apparatus having a processor, a memory and a cache, the processor being adapted to perform the steps of:
    obtaining a list of candidate data items to be prefetched, wherein a number of candidate data items is larger than the predetermined number of data items to be prefetched to the cache, wherein each candidate data item is associated with a score, the score indicating a likelihood of the candidate data item to be retrieved from the cache; and
    repeatedly selecting a candidate data item from the list and determining whether to add the candidate data item to the cache, wherein said selecting is based on an order of the list, wherein the order of the list is based on scores of the candidate data items, wherein said determining whether to add the candidate data item to the cache comprises:
        determining whether the candidate data item is retained by the cache; and
        in response to determining that the candidate data item is not retained by the cache, adding the candidate data item to the cache;
    wherein said repeatedly selecting and determining are performed until the predetermined number of data items is added to the cache.

11. The apparatus of claim 10, wherein the processor is further adapted to perform:
    in response to determining that the candidate data item is retained by the cache in a cache line, updating an evacuation measurement of the cache line.

12. The apparatus of claim 11, wherein the cache is a Least Recently Used (LRU) cache, wherein the evacuation measurement is a freshness measurement of the cache line.

13. The apparatus of claim 11, wherein said adding the candidate data item to the cache requires a first processing time duration, wherein said updating the evacuation measurement of the cache line requires a second processing time duration, wherein the second processing time duration is smaller than the first processing time duration.

14. The apparatus of claim 10, wherein a score associated with each candidate data item indicates the likelihood of the candidate data item being retrieved from the cache.

15. The apparatus of claim 14, wherein the score associated with each candidate data item is determined by a Machine Learning-based predictor.

16. The apparatus of claim 15, wherein Machine Learning-based predictor is based on a Long Short-Term Memory (LSTM) network.

17. The apparatus of claim 10, wherein said determining whether to add the candidate data item to the cache further comprises determining that the score of the candidate data item is above a predetermined threshold.

18. The apparatus of claim 10, wherein said obtaining a list comprises:
    obtaining an initial list that comprises the list and additional data items; and
    selecting an N-top candidate data items from the initial list based on corresponding scores thereof, whereby obtaining the list.

19. A computer program product comprising a non-transitory computer readable storage medium retaining program instructions, which program instructions when read by a processor, cause the processor to perform a method comprising:
- obtaining a list of candidate data items to be prefetched, wherein a number of candidate data items is larger than the predetermined number of data items to be prefetched to the cache, wherein each candidate data item is associated with a score, the score indicating a likelihood of the candidate data item to be retrieved from the cache; and
- repeatedly selecting a candidate data item from the list and determining whether to add the candidate data item to the cache, wherein said selecting is based on an order of the list, wherein the order of the list is based on scores of the candidate data items, wherein said determining whether to add the candidate data item to the cache comprises:
- determining whether the candidate data item is retained by the cache; and
- in response to determining that the candidate data item is not retained by the cache, adding the candidate data item to the cache;
- wherein said repeatedly selecting and determining are performed until the predetermined number of data items is added to the cache.

* * * * *